W. D. HARPER.

VEHICLE BODY SUSPENSION.

APPLICATION FILED FEB. 23, 1922.

Reissued Apr. 18, 1922. 15,336.

Inventor:
William D. Harper
by Wright, Brown Quinby & Ivey
Attys.

UNITED STATES PATENT OFFICE.

WILLIAM D. HARPER, OF NEWTON, MASSACHUSETTS.

VEHICLE-BODY SUSPENSION.

Specification of Reissued Letters Patent. Reissued Apr. 18, 1922.

15,336.

Original No. 1,366,796, dated January 25, 1921, Serial No. 378,445, filed May 3, 1920. Application for reissue filed February 23, 1922. Serial No. 538,777.

*To all whom it may concern:*

Be it known that I, WILLIAM D. HARPER, a citizen of the United States, formerly a resident of San Antonio, in the county of Bexar and State of Texas, and now a resident of Newton, in the county of Middlesex and State of Massachusetts, have invented certain new and useful Improvements in Vehicle-Body Suspensions, of which the following is a specification.

This invention relates to improvements in vehicle body suspensions, an object of the invention being to provide an improved construction and arrangement of parts which will permit a limited swing in all directions of the body on its supporting chassis.

A further object is to provide improved coupling means connecting the body and chassis which will take up shocks and jars, and prevent transmission of the same to the body.

A further object is to improve upon the construction disclosed in my application for patent filed June 20, 1919, and given Serial Number 305,525, subsequently patented November 2, 1920, No. 1,357,497.

With these and other objects in view, the invention consists in certain novel features of construction, and combinations and arrangements of parts as will be more fully hereinafter described and pointed out in the claims.

Figure 1:
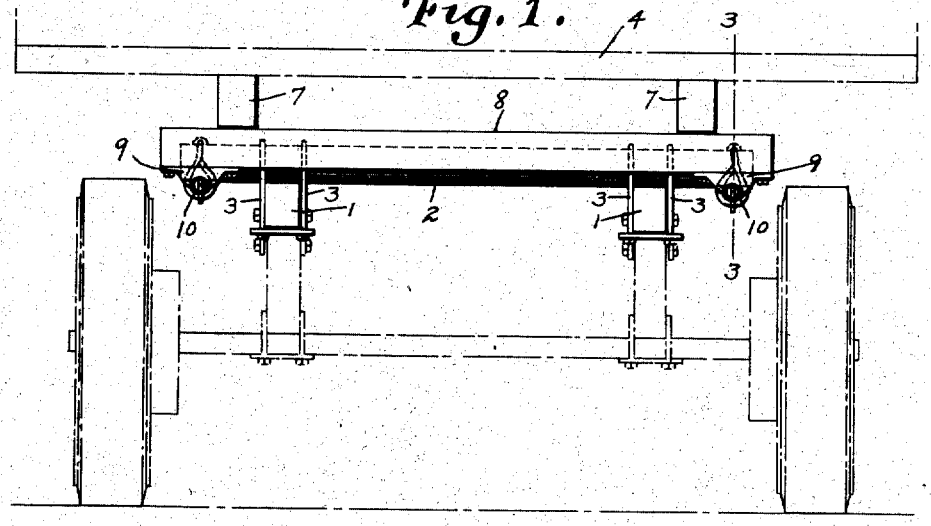
Figure 1 is a view in end elevation illustrating my improvements.
Figure 2:
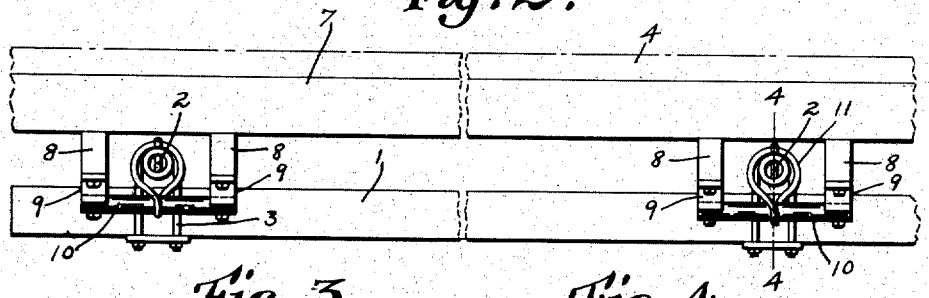
Figure 2 is a broken view in side elevation.

1, 1 represent the longitudinal bars of a chassis across which tubular transverse positioned supporting members 2 are located and secured on the bars 1 by means of U-bolts 3.

U-bolts 3 are provided at both sides of the bars 1 and at their upper ends straddle the tubes. The lower ends of the U-bolts 3 are projected through perforated plates 5 below the bars 1, and secured in place by means of nuts 6, thereby securely clamping the tubes 2 on the bars 1, so that said tubes form, in effect, fixed parts of the chassis.

4 represents the body, or platform thereof, supported on longitudinal bars 7, and the latter secured across transversely positioned bars 8.

Figure 3:
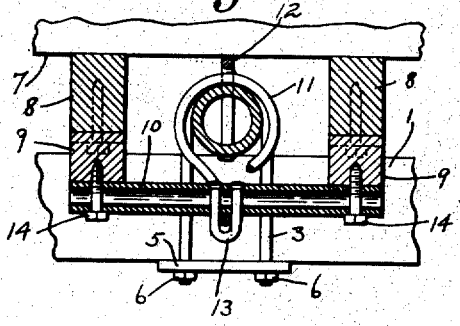
Figure 3 is an enlarged view in section on the line 3—3 of Figure 1.

The bars 8 are arranged in pairs, as shown clearly in Figure 3, and have depending blocks 9 at their ends.

Tubes 10 are secured to the bearing blocks 9 by means of screws 14 projected through the tubes 10 and screwed into the blocks 9; or any other form of securing means may be employed.

Figure 4:
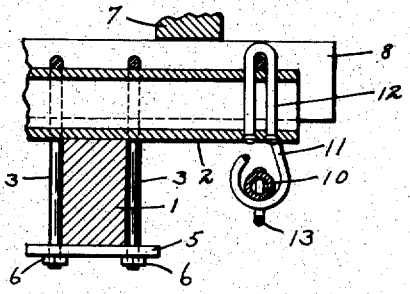
Figure 4 is an enlarged view in section on the line 4—4 of Figure 2.

It will be noted, particularly by reference to Figure 4, that the tubes 2 project beyond the bars 1, and that the tubes 10 are located under, and at right angles to the projecting ends of tube 2.

Twisted links 11, constituting hangers, are supported on the tubes 2 and in turn support the tubes 10 and the vehicle body 4.

The tubes 2 may be considered as generically the hanger abutments of the chassis, and may be called for brevity "chassis abutments;" while the tubes 10 similarly may be considered the hanger abutments of the body, and briefly designated as "body abutments."

The tubes 2 are of appreciably greater diameter than tubes 10 and the links or hangers 11 at their ends are of appreciably greater diameter than the tubes, so that said links are permitted a limited swaying or rocking movement on the said tubes, thus reducing slip to the minimum.

U-shaped rivets or staples 12 and 13 are secured in the tubes 2 and 10 respectively, and at their ends are positioned around the links 11 to hold the parts in proper relative position.

By reason of the construction above described, the body 1 is supported entirely at its four corners, by the links or hangers 11 and the tubes 2 and 10 which are coupled by said hangers, not only give a maximum strength and durability to the structure, but permit a swaying motion to permit the load to ride easily on the chassis, and absorb a large portion of the shocks and jars that would otherwise be transmitted to the body and load thereon.

The function and result of the above described rocking movement of the links on the tubes is that when the body moves forwardly or rearwardly with respect to the chassis, the upper loops of the links roll on the tubes 2; and when the body moves sidewise the lower loops roll about the tubes 10 coincidentally with the shifting of the latter tubes. Thus the points of tangency of the links with the tubes are shifted; that between the upper loop and the tube 2 shifting oppositely to the direction of swing, whereby the highest point of the link is raised above the tube; and that between the lower loop and the tube 10 shifting in the direction of swing toward what then becomes the upper side of the loop, whereby the lowest point of the latter tube is raised above its previous point of contact with said loop. Hence the movement of the body in any direction from its normal position of rest (i. e., that assumed when the vehicle is stationary and its wheel base level) is accompanied not merely by rise of the body, but by a rise which is greater and progressively more rapid than would be the case if the swinging movement took place about a fixed center at the highest point of the tube 2 on a radius of fixed length equal to the distance between the suspension points of the hanger in the normal position of rest.

In other words, each point of suspension of the body, when swinging in any direction from said position of rest, moves in a path which at the beginning is horizontal but in its outer parts rises with a constantly shortening radius of curvature. The outer portions of such path thus depart in increasing measure from the circumference of the circle whose radius is the distance between the tangent points of the links in the normal position of rest and whose center is the highest point of the tube 2. An important practical advantage results from this fact in that, since the first part of the movement of the body from its normal position of rest is in a comparatively flat arc of long radius, of which the approximately horizontal portion extends for an appreciable distance, gravity opposes no substantial resistance to the initiation of motion of the loaded body relatively to the chassis; but with further motion the body rises so rapidly that gravity checks it before the displacement has become excessive. That is, absence of resistance to initial relative motion, confinement of the total motion within relatively narrow limits, and arrest without shock of a motion of any extent, are accomplished by this simple device.

By appropriately designing the form of the coacting opposed faces of the tubes and hanger loops, and the amount and character of divergence of these coacting faces from one another, the proportion of the entire path of swing of the body which is substantially flat, and the proportion of that part which rises rapidly, and the extent of such rise may be more or less varied.

In the following claims the term "chassis" is to be construed as embracing the subsidiary or under frame, however it may be constructed in detail, of the vehicle, which is directly supported by the road wheels, and the term "body" includes any load-carrying member, however constructed, which is adapted to be supported on such chassis by hangers. By making the hanger as a link surrounding the abutment tubes 2 and 10, or equivalently as a rigid piece which embraces them and engages the top side of the chassis abutment and the bottom side of the body abutment, an important result in the direction of compactness, simplicity and economy is obtained; for the hanger abutments may be made sufficiently large for stiffness and strength and at the same time be placed close together and thereby contained in restricted spaces; at the same time the distance between the points of their engagement with the hanger is long enough to give the effect of initial swing on a flat arc of long radius without requiring any wide space between the cooperating abutments, and the hanger itself is a member of the utmost simplicity capable of being made at minimum cost.

While I have described the body as having my improved mounting at the four corners, it is obvious that any number of such connections might be employed and located as may be desired.

Various slight changes might be made in the general form and arrangement of the parts described without departing from my invention, and hence I do not limit myself to the precise details set forth, but consider myself at liberty to make such slight changes and alterations, as fairly fall within the spirit and scope of the appended claims. For instance, the link engaging members 2 and 10 herein shown and described as tubes, may be otherwise constructed provided they afford provision for rocking of the links, herein described, although tubes are preferred in this situation because they combine rigidity with lightness.

What I claim and desire to secure by Letters Patent is:

1. The combination in a vehicle with a sub-frame and superposed body, of transversely positioned abutment members on one of the before mentioned elements of the vehicle combination, longitudinally arranged members on the other of said elements, that member which is connected to the body passing beneath that member which is connected to the chassis, and a hanger surrounding those parts of the abutment members which cross one another and having its upper part arranged across and in rocking engagement with the upper side of the chassis-connected abutment member and its opposite part extending across, under and in rocking engagement with the body-connected abutment.

2. The combination with a chassis and a body, of transversely positioned tubes on the chassis, longitudinally positioned tubes secured at the corners of the body, twisted links supported at one end on the first mentioned tubes and having a rocking motion thereon, and said last-mentioned tubes mounted in the lower ends of the links and having rocking motion therein.

3. The combination with a chassis and a body, of transversely positioned tubes on the chassis, longitudinally positioned tubes secured at the corners of the body, twisted links supported at one end on the first mentioned tubes and having a rocking motion thereon, said last-mentioned tubes mounted in the lower ends of the links, and U-shaped devices secured in the tubes and engaging the links.

4. The combination with a chassis, a body, pairs of transverse bars on the body, and blocks on the lower faces of the bars, of tubes connecting the blocks and secured thereto, transverse tubes secured on the chassis and projecting beyond the sides of the latter, and link hangers on the last-mentioned tubes and supporting the first-mentioned tubes.

5. In a vehicle having a chassis element and a body element, hanger abutments on said chassis and body elements, respectively arranged to cross one another with the chassis abutment above the other, and a hanger embracing said abutments and having rocking engagement with each.

6. In a vehicle having a chassis element and a body element, hanger abutments on said chassis and body elements arranged with the chassis abutment above the other, and a hanger suspended from the chassis abutment and supporting the body abutment constructed and arranged to swing the body in an upwardly curved path, the curvature of which departs upwardly from the arc of a circle whose radius is the distance between the points of engagement of the abutments with the hanger in the position of rest, and whose center is the normal suspension point of the hanger on the chassis abutment.

7. In a vehicle, the combination, with a chassis or base construction and a body, of hanger abutments mounted upon the body and chassis, respectively, with that on the body below the corresponding one on the chassis, a hanger suspended from the chassis abutment and supporting the body abutment, the abutments and hanger being complementally so formed as to cause the suspended abutment when swinging from its normal position of rest to rise in a curved path having a progressively shorter radius of curvature.

8. In a vehicle, the combination with a chassis and a superposed body, of supporting means interposed between the chassis and body constructed to permit lateral movement of the body and cause such movement to take place in an upwardly curved path having a progressively shortening radius of curvature.

9. In a vehicle, the combination with a chassis or base construction having a hanger abutment, and a body also having a hanger abutment arranged beneath the chassis abutment, and a hanger consisting of a single member embracing both abutments and engaging the upper side of the chassis abutment and the lower side of the body abutment, and adapted to rock on each.

10. In a vehicle, the combination with a chassis or base construction having a hanger abutment, and a body also having a hanger abutment arranged beneath the chassis abutment, the chassis abutment having an upper curved engaging surface and the body abutment having a lower curved engaging surface, and a hanger comprising a single rigid member having an upper portion engaging said upper curved surface and a lower portion engaging said lower curved surface, the said portions of the hanger diverging from the surfaces with which they are respectively engaged.

11. In a vehicle, the combination with a chassis or base construction having a hanger abutment, and a body also having a hanger abutment arranged beneath the chassis abutment, the chassis abutment having an upper curved engaging surface and the body abutment having a lower curved engaging surface, and a hanger comprising a single rigid member having an upper portion engaging said upper curved surface and a lower portion engaging said lower curved surface, the said portions of the hanger diverging from the surfaces with which they are respectively engaged, whereby the hanger is adapted to rock on each of said surfaces, and the hanger and abutments being further so constructed and arranged as to permit rocking movement in directions respectively transverse to those of the first-named rocking movements.

12. In a vehicle, the combination with a chassis or base frame and a body, of a hanger abutment on the chassis having an upper curved supporting face, a hanger abutment secured to the body and having a lower curved hanger engaging face below the said supporting face of the chassis abutment and the axis of which is transverse to the axis of the first curved surface, and a hanger having an upper portion crossing the curved surface of the chassis abutment and adapted to rock thereon and thereacross, said hanger having a lower portion which is transverse to said upper portion and crosses in rocking engagement with the under curved face of the body abutment.

13. In a vehicle, the combination with a chassis or base frame and a body, of a hanger abutment on the chassis having an upper curved supporting face, a hanger abutment secured to the body and having a lower curved hanger engaging face below the said supporting face of the chassis abutment and the axis of which is substantially at right angles to the axis of the first curved surface, and a hanger having an upper loop crossing the curved surface of the chassis abutment and adapted to rock thereon and thereacross, said hanger having a lower loop the bottom part of which is approximately at right angles to the top of the upper loop and crosses in rocking engagement with the under curved face of the body abutment, those parts of the hanger which respectively engage the said abutment faces being formed to diverge from said faces, whereby in rocking over faces their respective tangent points are shifted.

14. In a vehicle, the combination with the chassis and body of such vehicle, each having hanger abutments, with the abutments of the body arranged below those of the chassis, and hangers embracing each cooperating pair of said abutments and engaging the upper side of the chassis abutment and the lower side of the body abutment, said abutments having means for preventing displacement of the hangers.

15. In a vehicle, the combination with the chassis and a body, of tubes forming hanger abutments connected to the body and chassis, respectively, and extending transversely to one another with the tube so connected to the body arranged below those connected to the chassis, hangers supported on the upper sides of the chassis connected tubes and underlying and engaging the under sides of the body connected tubes, and holding members on said tubes respectively engaging the hangers to hold the parts thereof in proper relative position.

In testimony whereof I have affixed my signature.

WILLIAM D. HARPER.